(12) United States Patent
Kraft et al.

(10) Patent No.: US 10,173,327 B2
(45) Date of Patent: Jan. 8, 2019

(54) DEVICE FOR USE IN THE HANDLING OF A LOAD AND METHOD FOR PRODUCING SUCH A DEVICE

(71) Applicant: FFT PRODUKTIONSSYSTEME GMBH & CO. KG, Fulda (DE)

(72) Inventors: Martin Kraft, Eichenzell (DE); Jochen Schneegans, Wittgert (DE)

(73) Assignee: FFT PRODUKTIONSSYSTEME GMBH & CO. KG, Fulda (DE)

( * ) Notice: Subject to any disclaimer, the term of this patent is extended or adjusted under 35 U.S.C. 154(b) by 244 days.

(21) Appl. No.: 14/896,565

(22) PCT Filed: Jun. 4, 2014

(86) PCT No.: PCT/EP2014/061541
§ 371 (c)(1),
(2) Date: Dec. 7, 2015

(87) PCT Pub. No.: WO2014/195340
PCT Pub. Date: Dec. 11, 2014

(65) Prior Publication Data
US 2016/0121488 A1 May 5, 2016

(30) Foreign Application Priority Data

Jun. 7, 2013 (EP) .................................... 13171149

(51) Int. Cl.
*B25J 19/00* (2006.01)
*B25J 15/00* (2006.01)
(Continued)

(52) U.S. Cl.
CPC ............. *B25J 15/00* (2013.01); *B25J 9/0012* (2013.01); *B25J 11/00* (2013.01); *B25J 15/0052* (2013.01); *B25J 15/0616* (2013.01); *B25J 19/007* (2013.01)

(58) Field of Classification Search
CPC ........ B25J 15/00; B25J 15/0616; B25J 11/00; B25J 9/0012; B25J 19/007; B25J 15/0052; Y10T 29/49139
See application file for complete search history.

(56) References Cited

U.S. PATENT DOCUMENTS 3,098,287 A * 7/1963 Buchsbaum ........... H05K 3/306
174/138 G
7,300,082 B2 * 11/2007 Rogers .................. B25J 13/085
294/104
(Continued)

FOREIGN PATENT DOCUMENTS

| CN | 2222688 Y | 3/1996 |
| CN | 101939133 A | 1/2011 |

(Continued)

OTHER PUBLICATIONS

International Search Report dated Oct. 7, 2014 of PCT/EP2014/061541.

(Continued)

*Primary Examiner* — Richard Chang
(74) *Attorney, Agent, or Firm* — Walter | Haverfield LLP; Sean F. Mellino; D. Peter Hochberg

(57) ABSTRACT

A device for use in handling a load and a method for producing the device are provided. The device comprises a three-dimensional framework that comprises a plurality of single parts, a cover made of a fiber-reinforced plastics with which the framework is covered, and at least one mounting unit for a handling unit for handling a part that is useable in the production of an object and that forms the load.

10 Claims, 8 Drawing Sheets

(51) Int. Cl.
   *B25J 9/00* (2006.01)
   *B25J 11/00* (2006.01)
   *B25J 15/06* (2006.01)

(56) References Cited

U.S. PATENT DOCUMENTS

| | | | |
|---|---|---|---|
| 7,980,611 B2* | 7/2011 | Zenpo | H01L 21/68707 |
| | | | 294/103.1 |
| 2005/0017529 A1* | 1/2005 | Rogers | B25J 13/085 |
| | | | 294/103.1 |
| 2007/0006462 A1 | 1/2007 | Van Zile, III | |
| 2009/0297319 A1 | 12/2009 | Kalb et al. | |
| 2010/0289201 A1 | 11/2010 | Strömberg | |

FOREIGN PATENT DOCUMENTS

| | | |
|---|---|---|
| DE | 202012102102 U1 | 7/2012 |
| EP | 2465651 A1 | 6/2012 |
| WO | 2005/102618 A1 | 11/2005 |
| WO | 2005102618 A1 | 11/2005 |

OTHER PUBLICATIONS

Written Opinion dated Dec. 7, 2015 of PCT/EP2014/061541.
IPRP and Written Opinion dated Dec. 8, 2015 of PCT/EP2014/061541.
Office Action and Search Report from the Austrian Patent Office dated May 9, 2018 for counterpart Austrian Patent Application No. 9198/2014.

* cited by examiner

DEVICE FOR USE IN THE HANDLING OF A LOAD AND METHOD FOR PRODUCING SUCH A DEVICE

CROSS-REFERENCE TO RELATED APPLICATIONS

This application a 371 National Stage application of International Application No. PCT/EP2014/061541, filed on Jun. 4, 2014, which claims foreign priority based on European Patent application EP 13 171 149.1 filed on Jun. 7, 2013, both of which are incorporated herein by reference in their entireties.

BACKGROUND OF THE INVENTION

Field of the Invention

The present invention relates to a device for use in handling a load and a method for producing such a device. In particular, the present invention relates to a device for use in handling a load and a method for producing such a device which can be used in a production plant. The production plant is in particular an assembly line for a vessel.

Description of the Prior Art

In production plants for industrially produced objects, like for example cars, media apparatuses, furniture, etc., single components of the object which is to be produced are usually moved from one place to another and/or a component is pivoted around its axis and/or is held for a determined way of handling in a specific position, etc. In the prior art a gripper tool is presently used that both can handle the load of the object and is sufficiently dimensioned to move the object securely and sufficiently fast from a starting position to a desired other position and to also hold the object in this position.

The gripper tools presently used in such production plants are comparatively heavy. As a result, a plant into which the gripper tool is integrated is to be planned for a big load which is to be handled. As a further result thereof, the necessary driving force for driving such a gripper tool is comparatively high. A further disadvantage lies in that a refitting of the production plant between different gripper tools which are each designed for specific gripping tasks is comparatively time consuming. This leads to long downtimes of the production plant.

EP 2 465 651 A1 shows a device for receiving and handling a component and a method for producing such a device. In comparison to the hitherto known gripper tools, the weight of the device is here remarkably reduced by approximately 20% to 50% by implementing the device as lightweight construction material block.

However, there is still a need for a device for use in handling a load, wherein the device has a small net weight but is such stabile that the device can handle a load having a weight which can exceed the net weight of the device many times and that the device is at the same time producible with low costs and flexibly and is adaptable in a simple way and with low costs to varying production conditions in the production plant where necessary.

SUMMARY OF THE PRESENT INVENTION

Therefore, it is the object of the present invention to provide a device for use in handling a load and a method for producing such a device with which the above-mentioned problems can be solved. In particular, a device and a method for use in handling a load and a method for producing such a device shall be provided in which the device has a low weight, is very flexibly adaptable and producible with low costs in comparison to known devices.

This object is solved by a device for use in handling a load according to the presently claimed invention. The device comprises a three-dimensional framework that comprises a plurality of single parts, a cover made of a fiber-reinforced plastics with which the framework is covered, and at least one mounting unit for a handling unit for handling a part that is useable in the production of an object and that forms the load.

The mentioned device has a very low weight, is producible simply and with low costs and is very flexible and easy adaptable. The device can be supplemented at desired positions, for example, by one or more cantilever arms for handling units, like in particular a gripper, by roughening the fiber-reinforced plastics and thereby is prepared for docking a further gripper arm. In this way, a repair of the device is also easily possible. Herein, also fastening units, like bore holes for screws, etc., riveting, etc., can be fastened to the framework.

"Handling" is herein in particular to be understood as gripping, sucking, holding, transferring, positioning at a predetermined position, moving, like pivoting, turning, shifting, lifting, etc., carrying, supporting, etc.

In the above-described device, the framework is composed of arbitrarily configurable single parts. The framework receives additional firmness and also the necessary stiffness by the cover or a jacket comprising the fiber-reinforced plastics.

The above-described device has in one implementation in which the device comprises, for example, three cantilever arms which are useable for handling, for example, a body part of a vessel, a remarkably reduced weight in comparison to the prior art. The same is valid for other implementations.

Advantageous further developments of the device are given in the dependent claims in accordance with the presently claimed invention.

In the above-described device, the single parts can be planar elements which comprise at least one plug unit with which the single parts can be assembled as the three-dimensional framework. Consequently, a light and low cost gripper system in plug construction is provided with the above-described device.

The single parts can also be planar elements comprising mating plug units so that the single parts can be mounted form-locking as the thee-dimensional framework.

There is the possibility that the single parts comprise at least one plug unit configured as a strap and a through opening, wherein the plug unit is configured such that the plug unit of one single part can be plugged into one through opening of another single part and thereafter can be fastened to the other single part, without the need for the use of tools.

Preferably, the single parts of the framework of the device comprise an edge indentation. The edge indentation can better receive and compensate the torsion forces occurring in strain. Therewith, the stability of the framework made from the single parts can be still further increased.

In the above-mentioned device, the framework can comprise at least one cantilever arm at which end is positioned a mechanical or fluidic handling unit at one of the at least one mounting units.

In case the device comprises a plurality of handling units, the handling units can interact for handling a part useable in the production of the object.

In the above-mentioned device, the fiber-reinforced plastics can comprise at least one selected from the group consisting of carbon fiber, glass fiber, basalt fiber, and continuous endless fiber-reinforced organo material.

The device can serve for handling of components for producing a vessel and/or of clamping frames for clamping of components of the vessel in the producing of the body of a vessel. In addition or as an alternative, it is also possible that the device comprises a coupling unit to couple the device with a moving device. Consequently, the device can be used as a carrying device, for example.

The above-described device can be part of a production plant for producing an object. The production plant further comprises at least one handling unit mounted at at least one mounting unit, and a moving device for moving the device in the space.

The object is further solved by a method for producing a device for handling a load according to the presently claimed invention. The method comprises the steps: assembling of single parts such that the single parts form together a three-dimensional framework at which at least one mounting unit is provided for a handling unit for handling as the load a part useable in the production of an object; attaching fiber material around the three-dimensional framework; applying resin onto the fiber material; and hardening the resin/fiber material composite as fiber-reinforced plastics as a cover of the frame work. The method achieves the same advantages as mentioned-above in respect of the device.

Advantageous further developments of the method are mentioned in the dependent claims in accordance with the presently claimed invention.

The step of assembling can be executed without tools by mounting mating plug units of the single parts form-locking as the three-dimensional framework.

Possibly, the method further comprises a step of cutting by at least one selected from the group consisting of a laser, a milling unit, a punching unit, and a water beam cutting unit, a plurality of single parts from a planar material.

In the method, the step of attaching of fiber-material can comprise a covering of the three-dimensional framework with a tubular fiber-material.

It is further possible, that the step of attaching of fiber-material is executed such that openings are exposed which serve for attaching the device to a moving device for moving the device in the space.

Further possible implementations of the invention also comprise combinations of features or styles described above or in the following with reference to the embodiments, even if they are not explicitly mentioned. Herein, the person skilled in the art will also add single aspects as improvements or additions to the respective basic form of the invention.

BRIEF DESCRIPTION OF THE DRAWINGS

In the following, the invention is described in more detail by means of embodiments and with reference to the appended drawing Figures, wherein.

In the drawing Figures, the same or functionally same elements are provided with the same reference signs unless given otherwise.

DETAILED DESCRIPTION OF THE PRESENT INVENTION

Figure 1:
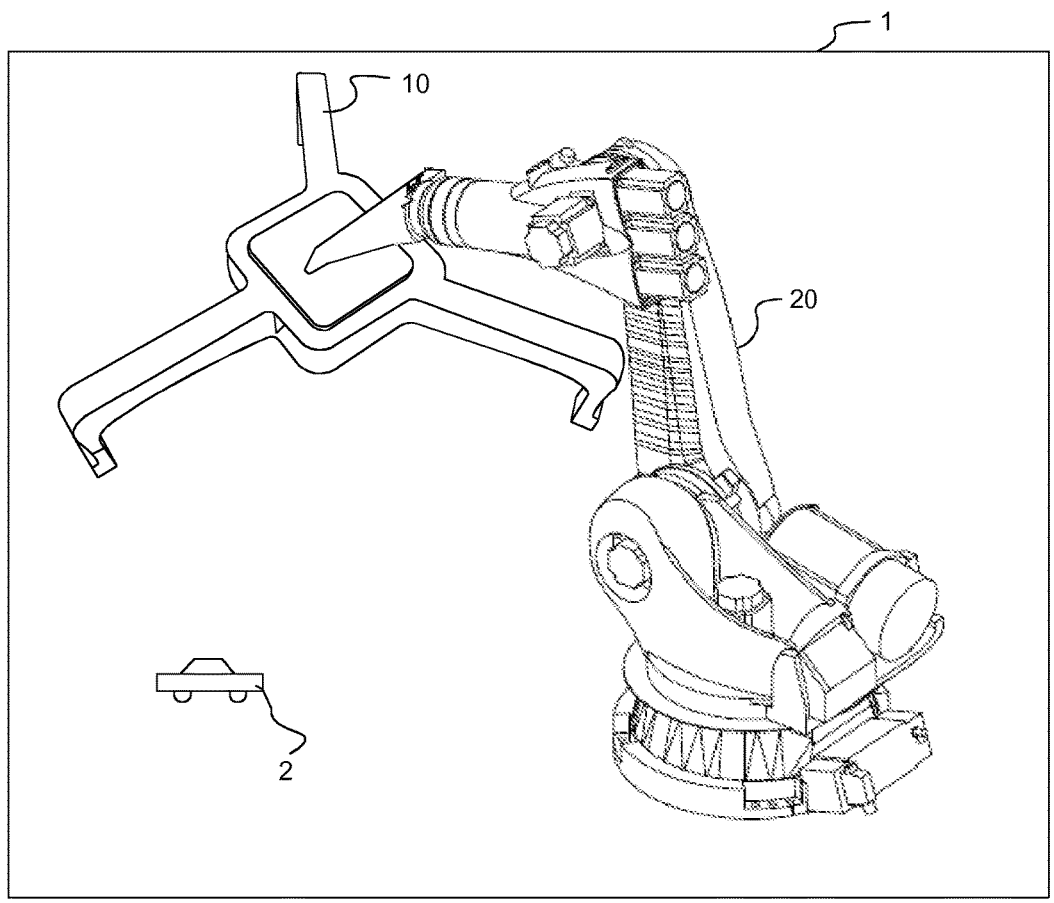
FIG. 1 shows a severely simplified view of a production plant comprising a device according to a first embodiment.

FIG. 1 shows a production plant for production or assembly of an object 2 from a plurality of components. In FIG. 1, the object 2 is a car and the production plant 1 can be an assembly line for a vessel, in particular a car, a truck, a plane, etc. The production plant 1 is, however, not limited thereto and can be a production plant for an arbitrary other industrially produced object.

A production plant 1 in FIG. 1 comprises a device 10 for handling a load like for example a component of the object 2. The component can be in particular a body part of the object 2 shown in FIG. 1 as a car. The component can, however, also be a clamping frame or framer which is usable for clamping of components of a vessel in the production of the body of a vessel. The production plant 1 in FIG. 1 further comprises a moving device 20 at which the device 10 is positioned. Herein, the device 10 is fixed to the moving device 20 such that the moving device 20 can move the device 10 in the space. Therewith, a load handled by the device 10 is moved in the space, as well. In FIG. 1, the moving device 20 is depicted as a robot. The moving device 20 can, however, have any other form like, for example, a devoting arm, a lifting device comprising a telescopic arm, etc.

Figure 2:
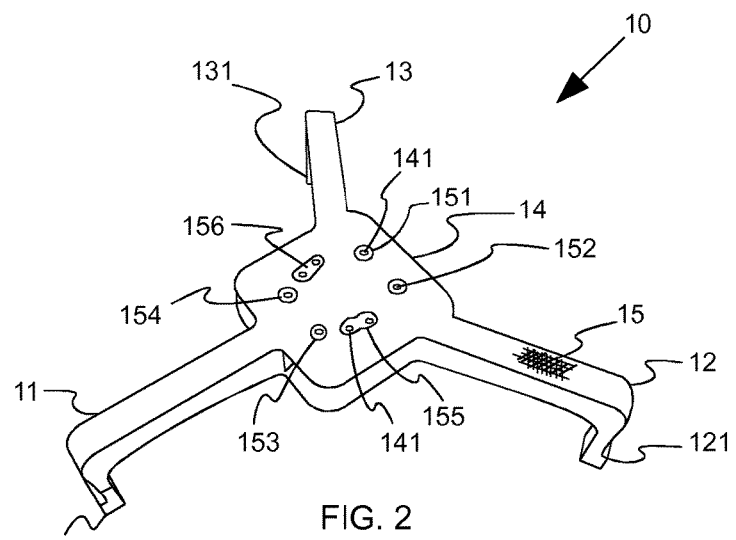
FIG. 2 shows a simplified three-dimensional top-view onto the device according to the first embodiment.

FIG. 2 shows the device 10 in a top-view in more detail. The device 10 comprises a first to third cantilever arm 11 to 13, a connecting body 14 for connecting the cantilever arms 11 to 13, and a cover 15 with which the device is covered on the outside. The cover 15 is indicated in FIG. 2 only at one position in detail. A first mounting unit 111 is positioned at one end of the first cantilever arm 11. A second mounting unit 121 is positioned at one end of the second cantilever arm 12. A third mounting unit 131 is positioned at one end of the third cantilever arm 13, wherein the third mounting unit 131 is hardly visible in FIG. 2. In case a handling unit, for example in form of a fluidic gripper, in particular a pneumatic gripper and/or a mechanical gripper, in particular a wire rope gripper and/or an electrical gripper and/or a magnetic coupling, is mounted at the mounting units 111, 121, 131, the grippers can interact for gripping and therewith handling a load. The handling unit can, however, also be a tool that is required in the production in the production plant 1.

As shown in FIG. 2, openings 141 are further provided in the connecting body 14, wherein the openings 141 are useable for mounting the device 10 to the moving device 20. Herein, the mounting of the device 10 to the moving device 20 can also be performed by automatically docking and undocking. For the sake of clarity, not all of the openings 141 are provided with a reference sign in FIG. 2. Around the openings 141, openings 151 to 156 of the cover 15 are provided such that the cover 15 is positioned close to the openings 141 but the openings 141 are exposed. The openings 141 are, thus, not covered with the cover 15. Moreover, to the device 10 in FIG. 3, no coupling unit is mounted with which the device 10 is coupled to the moving device 20.

Figure 3:
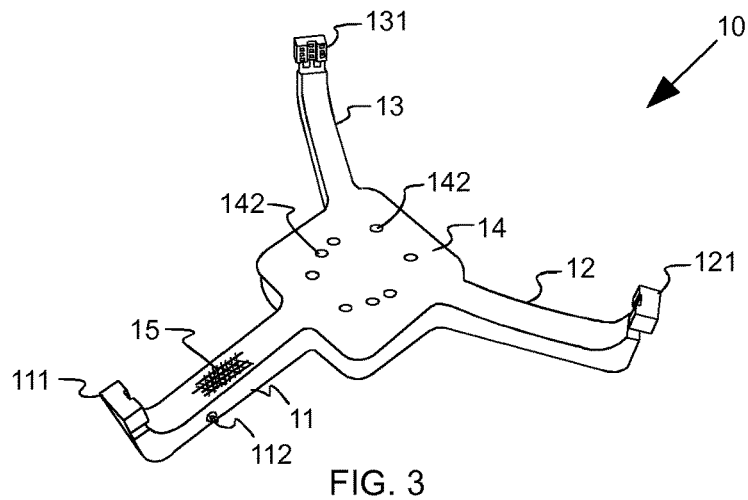
FIG. 3 shows a simplified three-dimensional bottom-view from below the device according to the first embodiment.

FIG. 3 shows the device 10 in a bottom view in more detail. Here, openings 142 are additionally provided at the bottom of the connecting body 14. For the sake of clarity, not all of the openings 142 are provided with a reference sign in FIG. 3. Moreover, a mounting unit 112 in the form of an opening for mounting a tool, a camera, a sensor, a further gripper or the like is provided at the side of the first cantilever arm 11. Also here, the cover 15, which is only indicated in FIG. 3, is provided around the mounting unit 112 such that the cover 15 is positioned close to the mounting unit 112, wherein the mounting unit 112 is however exposed and, thus, is not covered with the cover 15.

Figure 4:
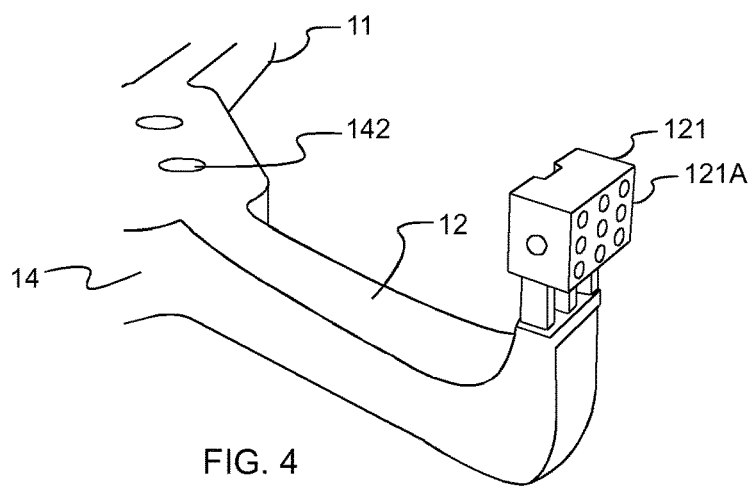
FIG. 4 shows a three-dimensional partial bottom-view of the device according to the first embodiment.

FIG. 4 shows a detail of FIG. 3 regarding the second mounting unit 121 in more detail. The second mounting unit 121, like also the first and second mounting units 111, 131, is configured such that a handling unit like a gripper, a tool, a camera or the like can be mounted to the second mounting unit 121. For example, the mounting unit 121 comprises a plurality of openings 121A with which a handling unit can be fixed in particular by screws, etc.

In the device 10 of FIG. 1 to FIG. 4, the cover 15 comprises a composite of carbon fiber and/or glass fiber and/or basalt fiber with resin. The cover 15 is, thus, a fiber-reinforced plastics. The cover 15 is laminated over a framework and realizes, therewith, additional firmness and the necessary stiffness, as well. This is described in the following in more detail. Alternatively, the cover 15 can also be composed of continually endless fiber-reinforced organo material, in particular organo sheeting. Such a material comprises thermoplastic plastics. Therewith, the continually endless fiber-reinforced organo material can be attached to the framework by heating the material above the melting temperature of the thermoplastic plastics and can then be laminated to the framework. A further alternative is to spray on fiber composite materials which provide the same property as the fiber-material.

Figure 5:
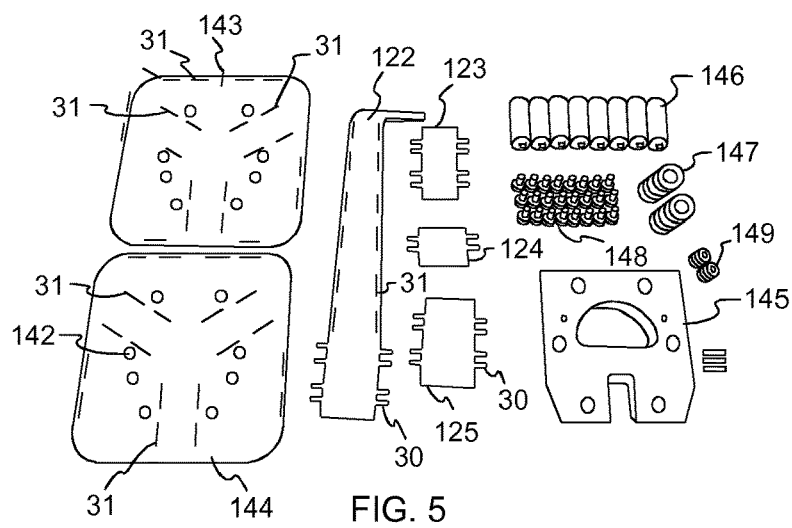
FIG. 5 shows an illustration of single parts of a partition of the device according to the first embodiment.
Figure 6:
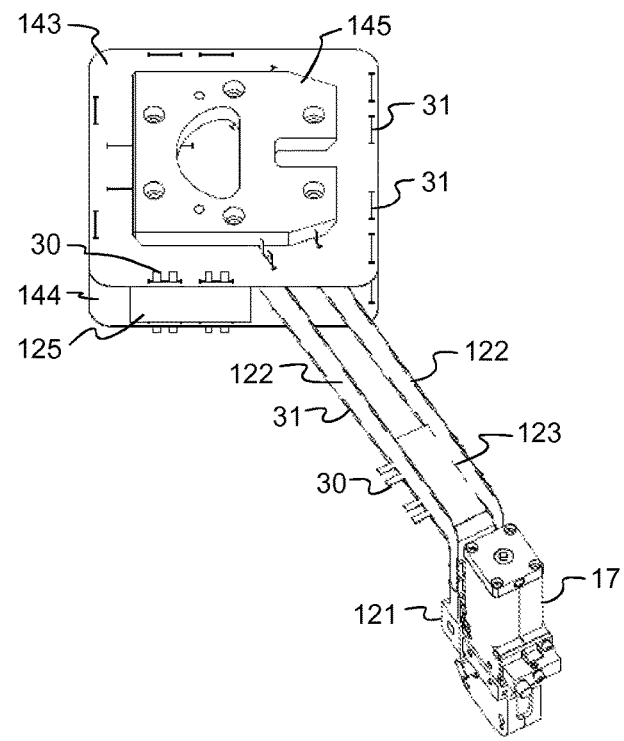
FIG. 6 shows a simplified three-dimensional top-view onto a framework of the device according to the first embodiment, wherein the framework is mounted from the single parts of FIG. 5.
Figure 7:
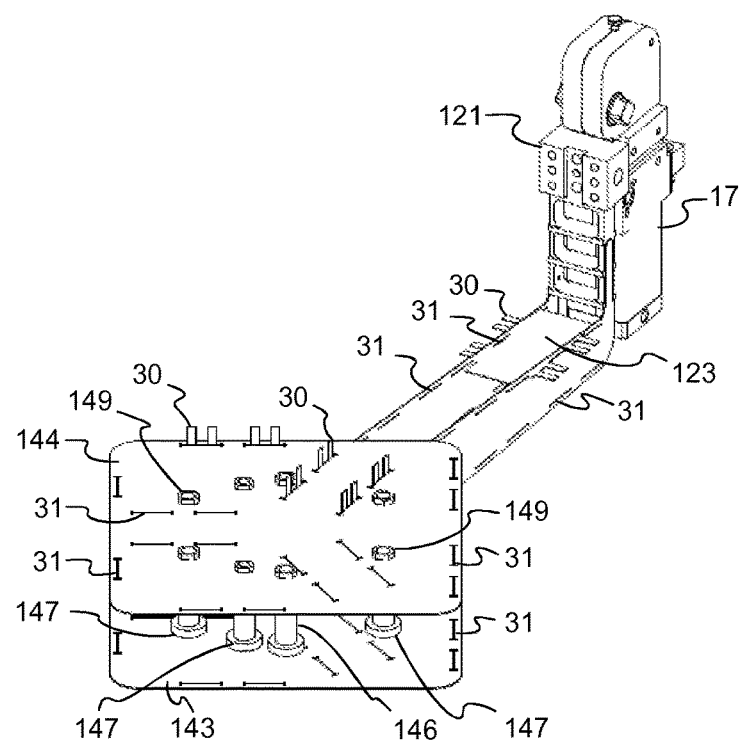
FIG. 7 shows a simplified three-dimensional bottom-view from below the framework of FIG. 6.
Figure 8:
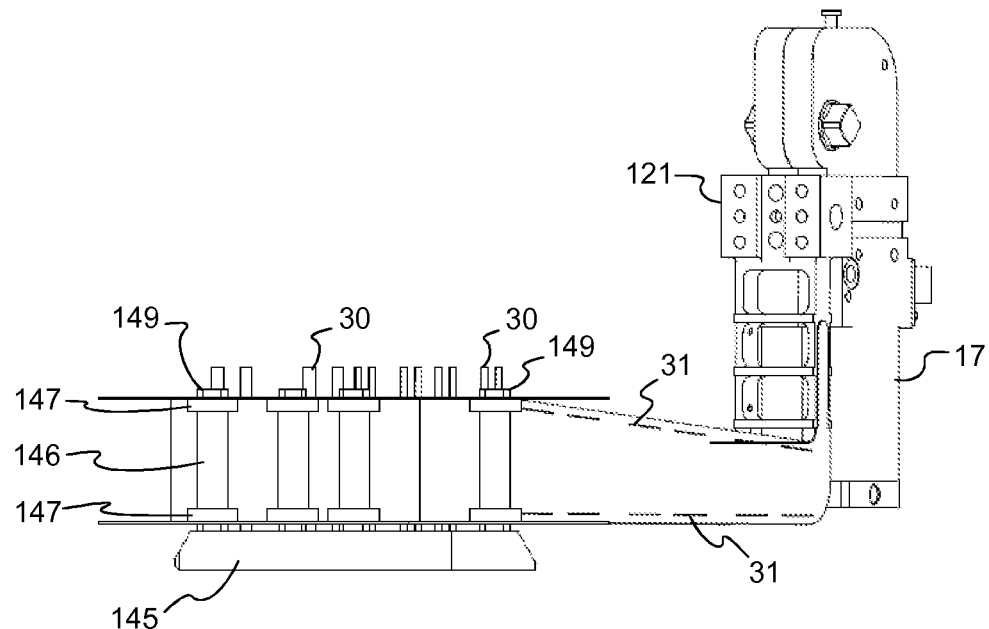
FIG. 8 and FIG. 9 each show a sectional view of the framework of FIG. 6.
Figure 9:
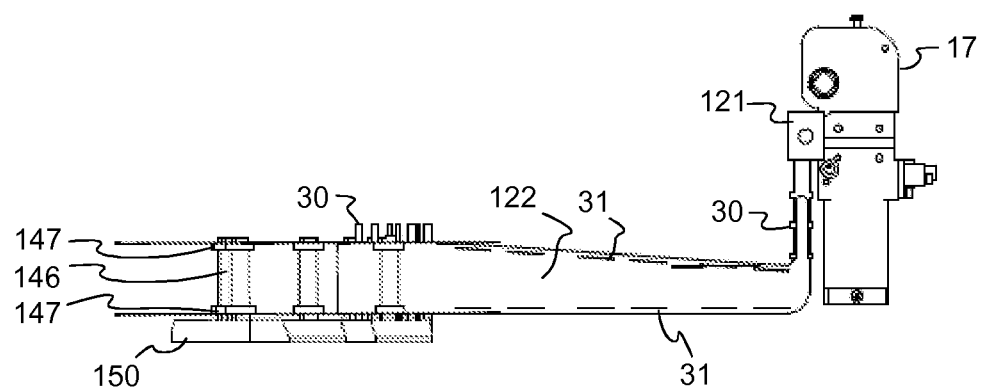
Figure 10:
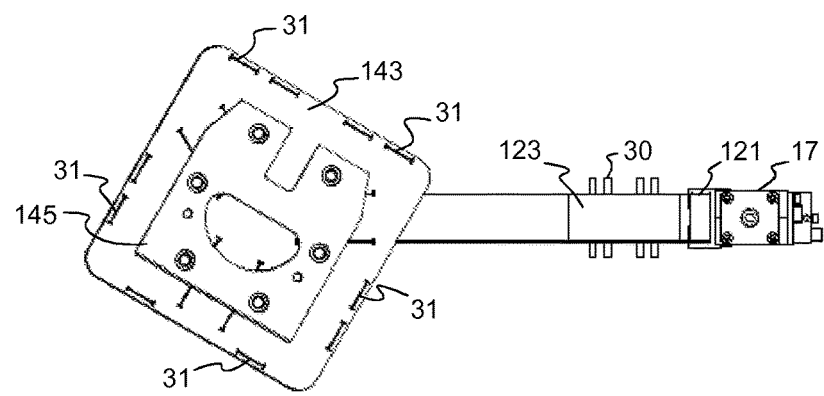
FIG. 10 shows a top-view onto the framework of FIG. 6.
Figure 11:
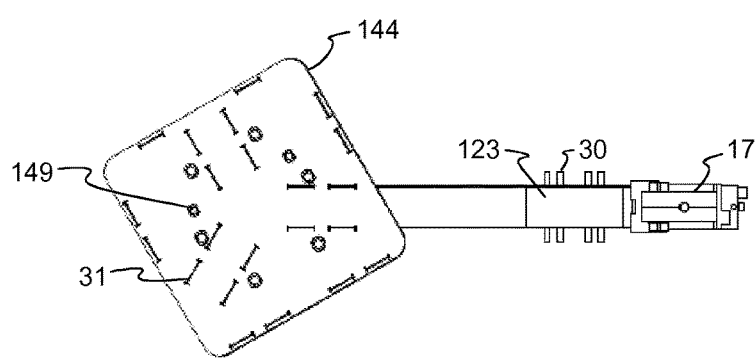
FIG. 11 shows a bottom-view from below the framework of FIG. 6.

FIG. 5 shows single parts of a framework from which single parts a partition of the device 10 is assembled, like shown in FIG. 6 to FIG. 11.

As can be seen from FIG. 5, the single parts 143 to 149 form the single parts, from which the framework for the connecting body 14 comprising the openings 141, 142 is assembled. In FIG. 5, only one of the single parts of the single parts 146 to 149 is provided with a reference sign for the sake of clarity. The single parts 143 and 144 are spaced by each other by the single parts 146 to 149 by mounting the single parts 146 to 149 between or at the single parts 143 and 144. The single parts 146 to 149 can, thus, be named as spacers. The single part 145 serves later on as a coupling unit for coupling the device 10 to the moving device 20. The single parts 122 to 125 form single parts of which the framework for the cantilever arm 12 is assembled. In FIG. 5, only one single part of the single parts 122 to 125 is shown, which are used for the cantilever arm 12. At the single part 122 are provided straps 30 which are pluggable into and through the through openings 31 of the single parts 143, 144. The single part 122 further comprises through openings 31 into and through which straps 30 of the single parts 123 to 125 are pluggable. A strap 30 and/or a through opening 31 are also named as plug unit 30, 31 in the following. In FIG. 5, not all of the straps 30 and through openings 31 of the single parts 143, 144, 122 to 125 are provided with a reference sign for the sake of clarity.

The single parts 143 to 149 and 122 to 125 can be produced from metal, in particular aluminum, iron, etc., from plastic, wood and combinations thereof, for example. The single parts 143, 144 and 122 to 125 can be produced in particular from galvanized sheeting. Other materials are also conceivable which realize the required basic firmness or basic stability for the framework.

FIG. 6 to FIG. 11 show the device 10 to which a handling unit 17 in the form of a gripper is mounted. For the sake of clarity, not all of the parts shown in FIG. 6 to FIG. 11 are provided with a reference sign.

Figure 12:
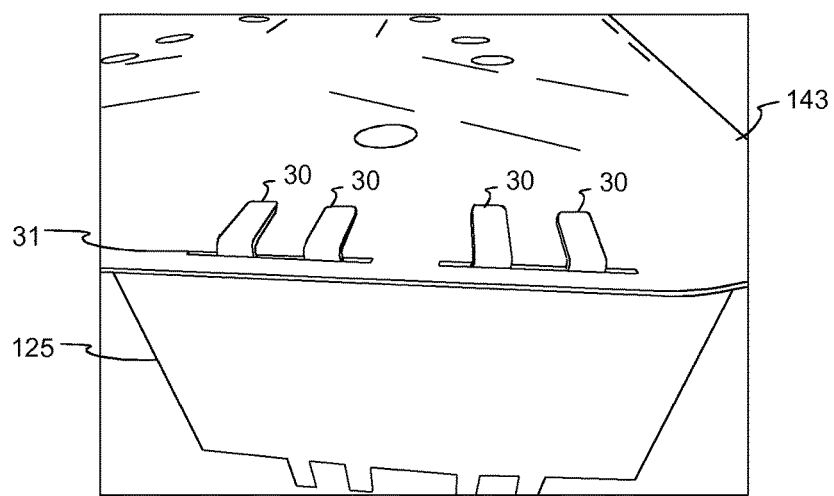
FIG. 12 shows a detail in respect to the framework of FIG. 6.

In FIG. 6 to FIG. 11, the plug units 30, 31 are only partly mounted. Thus, the straps 30 of the single parts 122 to 125 are indeed plugged into the through opening 31 and are plugged up to the edge of the single parts 143, 144, 122 to 125 through the through opening 31. However, the straps 30 are not yet bent and therewith fixed, as shown in FIG. 12 for the single parts 143 and 125. Due to this, the single parts in FIG. 6 to FIG. 11 are not yet fixed to each other completely. The straps 30 are configured herein such that they can be easily bent with the thumb of a hand, that means without tool or no tools needed. Therefore, no further tool is required for assembling the framework formed from the single parts 143 to 149 and 122 to 125. Should, however, a larger material thickness be required for the single parts 122 to 125, then at least one of the straps 30 can have such a material thickness that the strap 30 can no longer be bent by hand or by thumb. In such a case, a tool can be used for bending the straps 30, as well.

As soon as the framework is assembled from the single parts 143 to 149 and 122 to 125, as described above and in the following, the framework can be provided with the cover 15, as described above and in the following.

Figure 13:
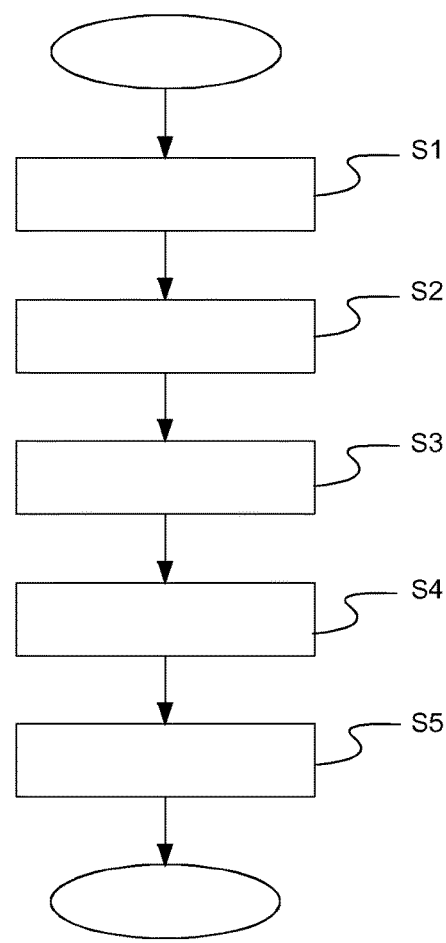
FIG. 13 shows a flow chart of a method for producing a device for handling a load according to the embodiment.

FIG. 13 shows very schematically a method for producing the device 10. Herein, after the start of the method in a step S1, a plurality of single parts, for example the single parts 143, 144 and 122 to 125 are cut from a planar material, in particular galvanized sheeting. The cutting can be performed with a laser and/or a milling unit by milling and/or a punching unit by punching and/or a water beam cutting unit by water cutting and/or another suitable processing depending on the situation, like for example spark erosion, electro erosion, etc. Herein, the through openings 31 are produced, as well. Thereafter, the flow proceeds to a step S2.

In the step S2, the single parts, for example the single parts 143 to 149 and 122 to 125 are assembled. Herein, the single parts are assembled such that they form together the three-dimensional framework, as illustrated in FIG. 6 to FIG. 12. The step of assembling can be executed without tool by mounting mating plug units of the single parts form-locking as the three-dimensional framework. In this step, also the mounting units 111, 121, 131 and where necessary also the handling units 17 are already mounted at the framework at their respective target position. Thereafter, the flow proceeds to a step S3.

In the step S3, to produce the cover 15, fiber material is attached around the three-dimensional framework which was produced in the step S2. This step can comprise for example a covering of the three-dimensional framework with a tubular fiber material. Alternatively or in addition, single fibers or fiber mats can be attached, in particular put onto, the framework, as well. Dependent on the desired stability and bearing force of the device 10, the fiber material can be attached in one layer or a plurality of layers to the framework. It is also possible herein that the fiber material is attached in one or more layers to only predetermined positions of the framework. For example, more layers of the fiber material can be attached to positions of the framework at which higher forces will take effect than to positions of the framework at which smaller forces will take effect. Moreover, the fiber material will be attached such that all openings are exposed that shall serve for attaching the device to the moving device 20 or for attaching a handling unit etc. Thereafter, the flow proceeds to a step S4.

In the step S4, resin is applied to the fiber material mounted in the step S3, the step of applying can be performed with a brush, for example. It is sufficient herein that the resin is present between the fibers of the fiber material. Excessive resin can simply be whipped off The fiber material soaked with resin, which fiber material can also be named laminating mat in the case of a tissue, is similar to a wet tissue. The step S4 can be omitted, for example, if the fiber material is sprayed together with resin as a fiber composite material. The steps S3 and S4 can further be regarded as a common producing step in case the fiber material is mounted and applied simultaneously via resin paint. Thereafter, the flow proceeds to a step S5.

In the step S5, the resin/fiber material composite formed in the step S3 is hardened as fiber-reinforced plastic and, thus, the cover 15 of the framework of the device 10 is formed. The hardening can be a cold hardening or a warm hardening dependent on the desired laminating type. By laminating the framework, the construction of the device 10 is given an additional firmness and stiffness on the one hand. On the other hand it is avoided therewith that the straps 30 projecting through the through openings 31 bend open again. With the exception of the openings 141, 142, 112, the framework is closed to the outside so that an intrusion of foreign matters, like dust, a liquid, etc., is prevented. Thereafter, the method is finished.

Hence, for the device 10, a modular construction system is provided with which it becomes possible to create a light, cost-efficient gripping system in plug construction. The framework of the device 10 receives additional firmness by the jacket made of the fiber material. Further, the necessary stiffness of the device 10 can ensured.

Figure 14:
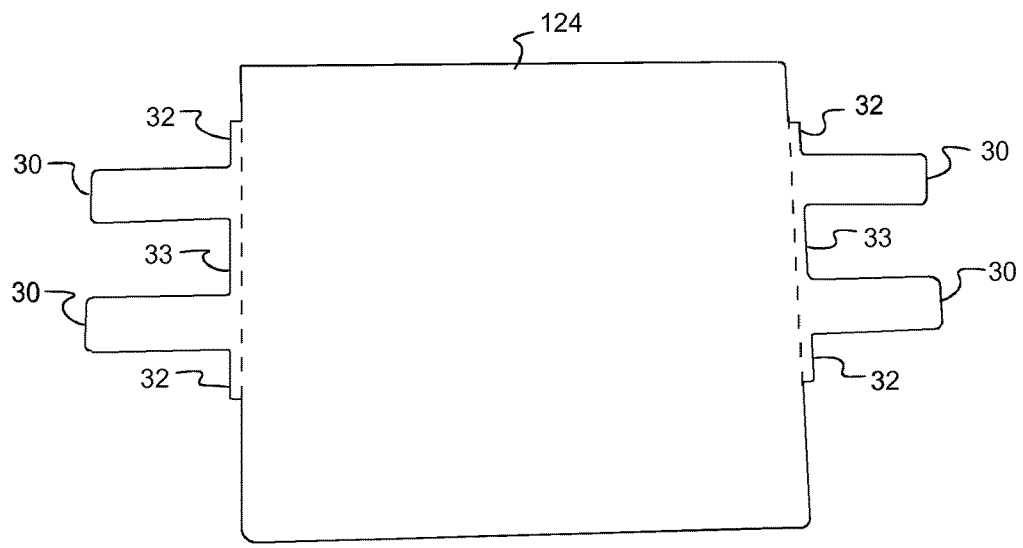
FIG. 14 shows a detail of a single part of a device according to a second embodiment.

FIG. 14 shows the single part 124 in detail, which single part 124 is used for a framework of a device 10 according to a second embodiment. The device 10 according to the present embodiment is implemented in most parts in the same manner as described in respect of the first embodiment. Therefore, only the differences to the first embodiment are described in the following.

The single part 124 shown in FIG. 14 has a centering plug unit that comprises in FIG. 14 two straps 30, two noses 32 and a bar 33. The bar 33 is positioned herein between the both straps 30, that means at one of the sides of the straps. One of the noses 32 is positioned on the other side of one strap 30. The noses 32 and the bar 33 each project a little bit out of the edge of the single part 124 as illustrated by the broken lines in FIG. 14. In contrast thereto, the both straps 30 each project many times further out of the edge of the single part 124 than the noses 32. Preferably, the noses 32 and possibly also the bar 33 project out of the edge of the single part 124 so far that they can grip into one through opening 31 of another single part, one single part 122 in this case, however, that they do not project out of the through opening 31 in case the straps 30 are bent, as shown in FIG. 12 in the first embodiment.

The whole width of the straps 30, the noses 32 and the bars 33 at the edge of the single part 124 is a little bit smaller than the width of a through opening 31 so that the straps 30, noses 32 and the bar 33 of the single part 124 can form a form-lock with the through opening 31 of the single part 122, when they are mounted at the latter in a similar manner as shown in FIG. 6 to FIG. 12 for the single parts 123, 125. The entire width corresponds to the length of one of the broken lines in FIG. 14. The form-lock has an effect of centering as a slip protection for the mating single parts 122 to 125, 143, 144 and contributes therewith to the stiffness of the component, as well. The stiffness of the component relates herein both to the framework built from the single parts 122 to 125, 143 to 149 and to the device 10 accomplished therewith.

The other single parts of the device 10, wherein straps 30 are provided at the single parts, can be implemented in the same way with straps 30 and noses 32 as the single part 124.

Figure 15:
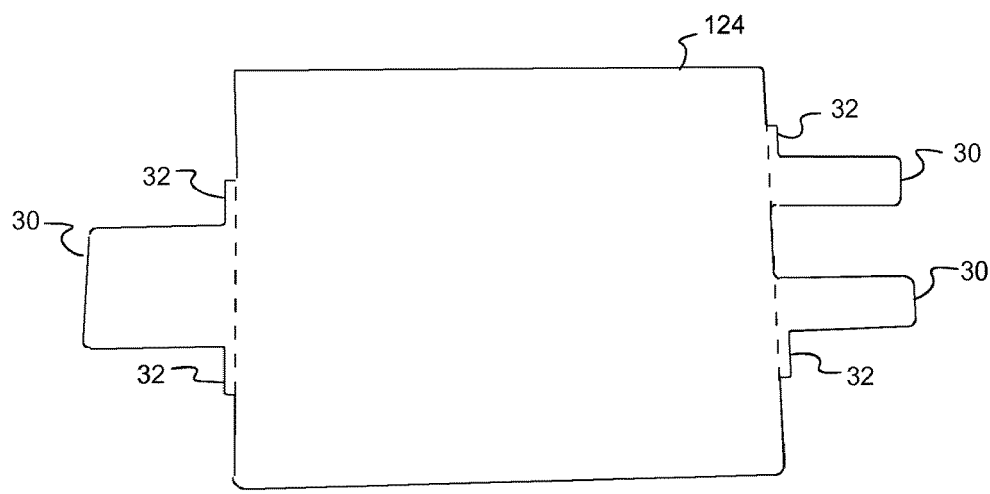
FIG. 15 shows a detail of a single part of a device according to a third embodiment.

According to a third embodiment, the centering plug unit does not comprise a bar 33, as shown in FIG. 15. According to a first modification, only one strap 30 is existent herein, at which sides each is positioned one nose 32, as illustrated in FIG. 15 at the left edge of the single part 124. According to a second modification, in fact two straps 30 are existent at which sides each is positioned one nose, as illustrated in FIG. 15 at the right edge of the single part 124. However, the edge of the single part 124 does not project between the straps 30 but is located, for example, on the same straight line like the edge of the single part 124. Alternatively, the edge of the single part 124 located between the straps 30 can also be slotted out of the single part 124 in comparison to the other edge of the single part 124.

Figure 16:
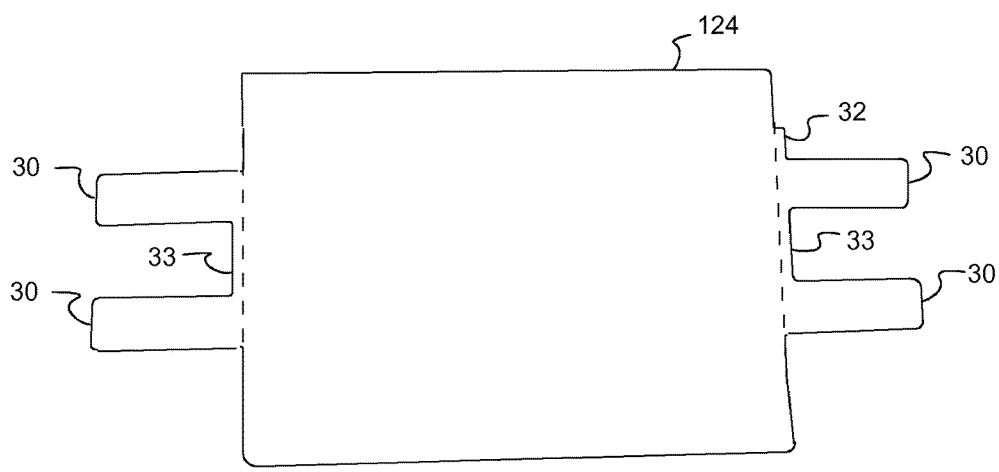
FIG. 16 shows a detail of a single part of a device according to a fourth embodiment.

According to a fourth embodiment, the centering plug unit does not comprise noses 32 as shown in FIG. 16 at the left edge of the single part 124. Alternatively, there can also be present only one nose 32 as shown in FIG. 16 at the right edge of the single part 124. In this case, the form-lock between the single parts 122 to 125, 143, 144 for the slip protection is formed by at least the straps 30 and possibly one nose 32.

Figure 17:
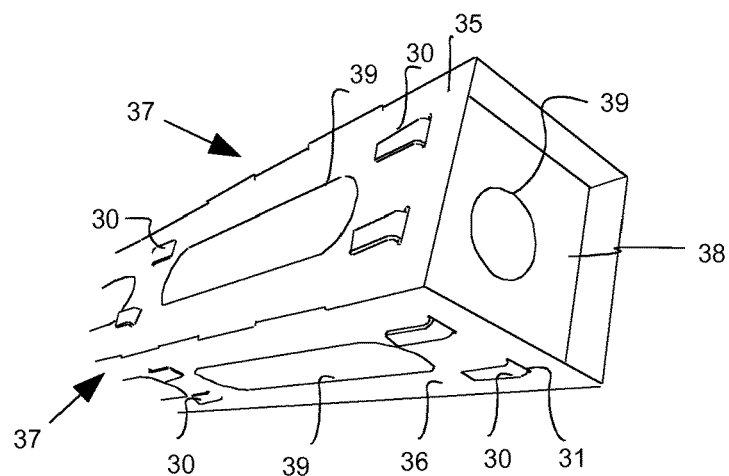
FIG. 17 shows a detail of a framework of a device according to a fifth embodiment.

According to a fifth embodiment, single parts 35, 36 of the framework of the device 10 comprise an edge indentation 37 as shown in FIG. 17. Herein, the edges of the single parts 35, 36 are formed such that they mate when the single parts 35, 36 are brought to each other at their edges. The single parts 35, 36 are assembled with a single part 38 and further single parts 35, 36, which are not visible, as a box section in which the single part 38 forms a lid positioned in the box section. The single part 38 has straps 30 which are guided in FIG. 17 through the through openings 31 of the single parts 35, 36 and are bent onto the single parts 35, 36. For the sake of clarity, not all of the straps 30 and through openings 31 are provided with a reference sign in FIG. 17. The single parts 35, 36, 38 have openings 39 which are formed in FIG. 17 as through openings 39, too, so that the framework becomes still lighter. The openings 39 can be implemented in particular as elongated hole or round hole, as shown in FIG. 17. However, other forms for the openings 39 are also conceivable. Depending on the material thickness, the openings 39 can also form a blind hole.

As shown in FIG. 17, the bending straps 30 are not positioned in the rim area of the single part 35 in the framework made of the single parts 35, 36, 38 comprising the edge indentation 37, as described in the preceding embodiment, but are positioned further to the inside at the single part 36. Therewith, the framework formed from the single parts 35, 36 and one single part 38 will be even more stable.

In this embodiment, no material tear or material break can happen in the rim area of the single parts 35, 36, 38. Moreover, no sharp-edged forms will arise herein which have to be filled up by light filling material as they are possibly existent in the preceding embodiments.

The edge indentation can be prepared in the method described in respect of FIG. 13 in the step Si by cutting or excavating the desired serrations at the single parts 35, 36.

Figure 18:
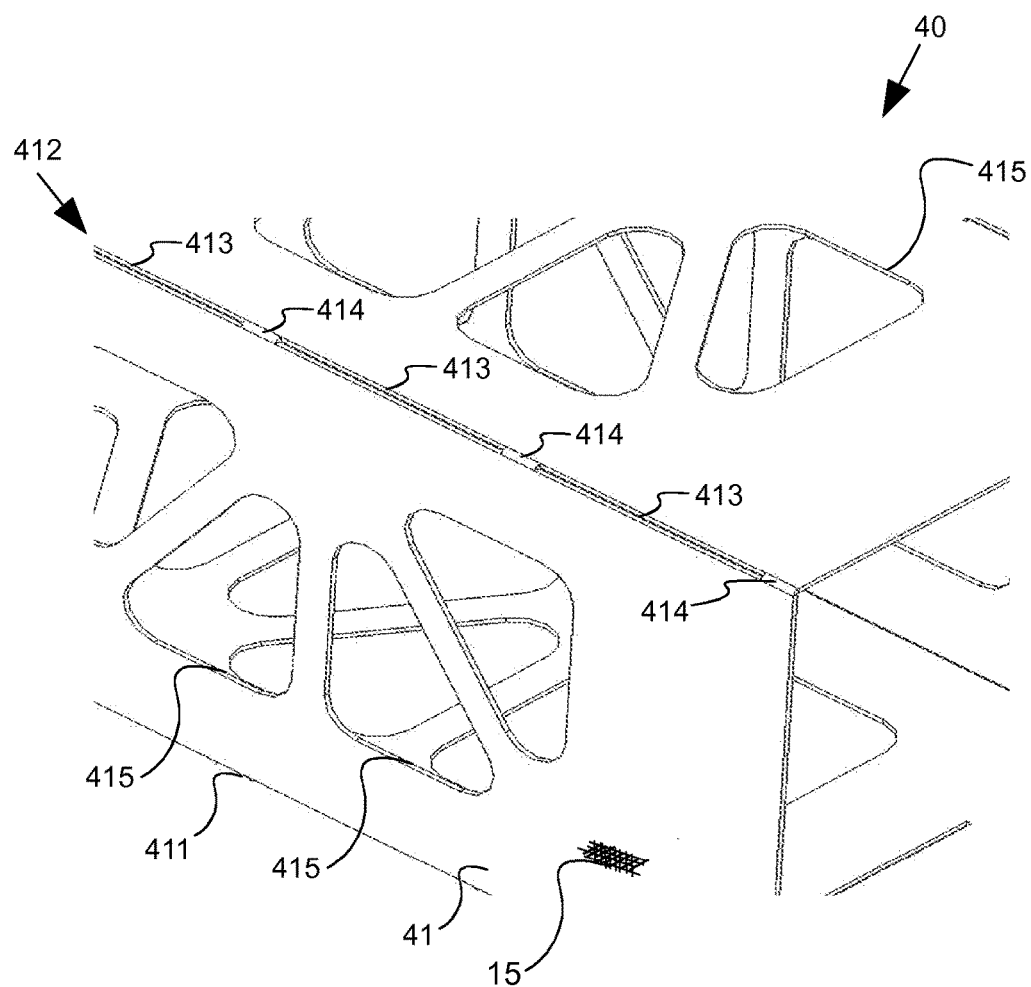
FIG. 18 shows a three-dimensional view of a single part of a framework of a device according to a sixth embodiment.

FIG. 18 shows a part of a device 15 according to a sixth embodiment, which device can be used, for example, for gripping a body side part of a vessel. The device 40 is constructed in general in the same manner as described in respect of the preceding embodiments. Consequently, also the device 40 comprises a three-dimensional framework that comprises one or a plurality of single parts, as described in the following, and a cover 15 made of a fiber-reinforced plastics with which the framework is covered, even if this cover 15 is only indicated in FIG. 18. Further, also the device 40 comprises a mounting unit similar to the mounting units 111, 121, 131 according to the preceding embodiments and as shown in FIG. 3 for a handling unit 17 (FIG. 6 or FIG. 7) for handling a part that forms the load and that is usable in a production of an object 2 (FIG. 1). In the following, only the differences to the preceding embodiments are described so that it is referred to the description of the preceding embodiment for the rest.

The device 40 in FIG. 18 has a single part 41 bent from a planar sheeting into a box sector in which two opposing ends of the single part 41 touch each other and are plugged together at one edge 411. The other three edges of the single part 41 of FIG. 18 are in contrast thereto all bending edges that are preferably implemented as shown for a bending edge 412 in FIG. 18. At the bending edge 412, bending openings 413 formed as a slit are positioned between material hinges 414, respectively. The single part 41 further comprises a plurality of weight reducing cavities 415. The weight reducing cavities 415 are formed for the single part 41 in FIG. 18 as a triangle, however, can comprise an arbitrary form. For the sake of clarity, not all of the cavities 415 are provided with a reference sign in FIG. 18.

In the single part 41 of FIG. 18, the bending of the single part 41 at its bending edges 412 is facilitated by the bending openings 413 in the form of a slit, since only the material hinges 414 have to be bent into the desired form, by 90° in this example. In this manner, mounting the planar single part 41 into the box sector or in a profile having a three angular or multi angular profile is particularly easy even without tool. Therewith, the device 40 can be arbitrarily designed as needed with planar single part, cut from sheeting, for example.

Therewith, an optimizing weight reduction can be realized with the device 40 as in the preceding embodiment but without the need to resign stability for the device 40. Also the device 40 made from one or a plurality of single parts 41 covered with the cover 15 can, thus, fulfil all of the requirements in respect of lightness, stability, flexibility and low costs.

All of the above-described implementations of the devices 10, 40 and the method can be used separately or in all possible combinations thereof. In particular, an arbitrary combination of the features of the first to sixth embodiments is possible. Moreover, in particular the following modifications are conceivable.

The elements shown in the figures are depicted schematically and can differ in the specific implementation from the forms shown in the figures provided that the above-described functions are ensured.

The form of the devices 10, 40 is arbitrarily selectable, respectively. In particular, the number of the cantilever arms 11, 12, 13 of the devices 10, 40 can freely be selected. In particular, only one cantilever arm or no cantilever arm is possible, as well. Further, the number of the connecting bodies 14 is arbitrarily selectable. The same is valid for the form of the cantilever arms 11, 12, 13 and the connecting bodies 14.

The edges of the single parts are preferably implemented as rounded in the framework of the respective devices 10, 40. Constructions having no sharp-edged forms are preferred. Therewith, laminating with the fiber material is promoted. For example, filling material made from light weight construction material like paperboard, felt, etc., can be applied to the component 125 to equalize the offset shown in FIG. 12 between the components 125, 143. Therewith, the bending radius of the fibers of the fiber material can be optimized.

It is also possible that one or more single parts of the framework of the respective devices 10, 40 consist from a tubular material. However, since planar single parts are usually simpler and/or cheaper formable, transportable and processable, planar single parts are preferred.

The plug unit can be implemented instead of a strap 30 by a snap hook and/or welding hoop. As a matter of course, other forms for the plug unit are possible, as well. The through opening 31 is to be formed correspondingly, in which the snap hook and/or welding hoop shall mate. Also a combination of strap 30 and snap hook or a combination of strap 30 and welding hoop is possible. Further, strap 30, snap hook and welding hoop can be combined for a plug unit. Alternatively, more than one strap 30 and/or snap hook and/or welding hoop can be used for a plug unit.

The steps S1 and/or S2 of the method for producing one of the devices 10, 40 can also be implemented already by another producer than the producer who produces the cover 15 by the steps S3 to S5. In particular, it is also possible to deliver a construction module system comprising the single parts according to FIG. 5 so that a producer of the device 10 or 40 only needs to execute the steps S2 to S5.

Even if the direction of the web of the single layers of the fiber material is insubstantial in many cases in the step S3 for the devices 10, 40, crossing of the web direction of layers of fiber material laying side by side can result in a higher stability and firmness of the device 10. Therefore, placing the layers of fiber material crosswise is preferred in this respect. Preferably, the fiber is directed in the direction of the expected load to optimally receive the forces.

Even if it is described above for the devices 10, 40 that the cover 15 closes the framework to the outside except for the openings 141, 142, 112, this is not mandatory. For example, it is possible in particular in an extreme light weight construction that the cover 15 and therewith the fiber material for the cover 15 is attached to only one side of the framework.

The form of the device 40 is selectable arbitrarily, as well. The device 40 can be assembled from at least one single part 41 and where necessary with one or more single parts of the device 10. As the need may be, sleeves comprising three, four or more edges can be formed from planar single parts, wherein the sleeves can be connected with each other, in particular, by bended sleeves or sleeves having T-form etc. that are each produced from planar elements. The connection can be in particular plugged and/or fixed with bending straps. Herein, not all of the described openings, cavities, bending straps, or material hinges have to be realized at the single part(s) as they are shown in the drawings.

Having described preferred embodiments of the invention, it will be apparent to those skilled in the art to which this invention relates, that modifications and amendments to various features and items can be effected and yet still come within the general concept of the invention. It is to be understood that all such modifications and amendments are intended to be included within the scope of the present invention.

What is claimed is:

1. A device for use in handling a load, the device comprising:
   a three-dimensional framework that comprises a plurality of individual single parts, wherein at least one part of the individual single parts is a planar clement which comprises at least one plug unit which projects as a projection of the planar element out of an edge of the planar element and with which one individual single part of said plurality of single parts can be assembled between at least two other single parts of the three-dimensional framework;
   a cover made of a fiber-reinforced plastics with which the framework is covered to prevent said plug unit from being released from the corresponding individual single part to which the plug unit is fastened to assemble two individual single parts; and
   at least one mounting unit for a handling unit for handling a part that is useable in a production of an object and that forms the load.

2. The device according to claim 1, wherein the plurality of single parts are planar elements which comprise at least one plug unit with which the plurality of single parts can be assembled as the three-dimensional framework.

3. The device according to claim 2, wherein the plurality of single parts comprise said at least one plug unit configured as a strap or a through opening, wherein a plug unit of said at one plug unit is configured such that the strap of one single part is plugged into one through opening of another single part and thereafter fastened to the other single part without the need for the use of tools.

4. The device according to claim 1, wherein the plurality of single parts are planar elements comprising mating plug units so that the plurality of single parts can be mounted form-locking as the thee-dimensional framework, and/or material hinges for facilitating bending the planar elements at a bending edge.

5. The device according to claim 1, wherein the plurality of single parts of the framework of the device comprise an edge indentation.

6. The device according to claim 1, wherein the framework comprises at least one cantilever arm at which end is positioned a mechanical or fluidic handling unit at one of the at least one mounting units.

7. The device according to claim 1, wherein the device comprises a plurality of handling units which interact for handling a part useable in the production of the object.

8. The device according to claim 1, wherein the fiber-reinforced plastics comprises at least one selected from the group consisting of carbon fiber, glass fiber, basalt fiber, and continuous endless fiber-reinforced organo material.

9. The device according to claim 1, wherein the device serves for handling of components for producing a vessel and/or of clamping frames for clamping components of the vessel in producing of the body of a vessel, and/or wherein the device comprises a coupling unit for coupling the device to a moving device for moving the device in the space.

10. A production plant for producing an object, the production plant comprising:
    a device for use in handling a load a three-dimensional framework that comprises a plurality of individual single parts, wherein at least one part of the individual single parts is a planar element which comprises at least one plug unit which protects as a projection of the planar element out of an edge of the planar element and with which one individual single part of said plurality of single parts can be assembled between at least two other single parts of the three-dimensional framework;
    a cover made of a fiber-reinforced plastics with which the framework is covered to prevent said plug unit from being released from the corresponding individual single part to which the plug unit Is fastened to assemble two individual single parts; and
    at least one mounting unit for at least one handling unit for handling a part that is useable in a production of an object and that forms the load;
    the at least one handling unit mounted to the at least one mounting unit; and
    a moving device for moving the device in a space.

* * * * *